(12) United States Patent
Mahlich

(10) Patent No.: US 7,444,925 B2
(45) Date of Patent: Nov. 4, 2008

(54) MACHINE-READABLE IDENTIFIER ON A PORTION PACKAGE, WHICH CONTAINS GROUND COFFEE, FOR ESPRESSO MACHINES

(75) Inventor: Gotthard Mahlich, Forsthaus 2, Kronberg (DE) 61476

(73) Assignees: Eugster/Frismag AG, Romanshorn (CH); Gotthard Mahlich, Krongberg (DE)

(*) Notice: Subject to any disclaimer, the term of this patent is extended or adjusted under 35 U.S.C. 154(b) by 406 days.

(21) Appl. No.: 10/473,397

(22) PCT Filed: Mar. 20, 2002

(86) PCT No.: PCT/EP02/03282

§ 371 (c)(1),
(2), (4) Date: Sep. 30, 2003

(87) PCT Pub. No.: WO02/078498

PCT Pub. Date: Oct. 10, 2002

(65) Prior Publication Data

US 2004/0089158 A1 May 13, 2004

(30) Foreign Application Priority Data

Mar. 31, 2001 (DE) .............................. 101 16 239

(51) Int. Cl.
*A47J 31/00* (2006.01)

(52) U.S. Cl. ................. 99/289 P; 99/289 R; 99/295

(58) Field of Classification Search ............ 99/295, 99/323, 289 P, 302 R, 280, 289 R; 426/77, 426/78, 82
See application file for complete search history.

(56) References Cited

U.S. PATENT DOCUMENTS

| | | | |
|---|---|---|---|
| 4,230,266 A | 10/1980 | Juvinall | |
| 4,829,889 A * | 5/1989 | Takeuchi et al. | ........... 99/289 P |
| 5,158,793 A * | 10/1992 | Helbling | ..................... 426/231 |
| 5,855,161 A * | 1/1999 | Cortese | ..................... 99/289 P |
| 5,974,950 A * | 11/1999 | King | ..................... 99/289 R |
| 2002/0048621 A1 * | 4/2002 | Boyd et al. | ..................... 426/77 |

FOREIGN PATENT DOCUMENTS

| | | |
|---|---|---|
| CH | 588 958 A5 | 6/1977 |
| DE | 43 12 093 | 4/1993 |
| EP | 0 972 481 A | 1/2000 |
| EP | 1 046 366 A1 | 10/2000 |
| FR | 2 625 348 A | 6/1989 |
| JP | 4-96192 | 3/1992 |
| JP | 2000-262405 | 9/2000 |
| JP | 2001-250161 | 9/2001 |

* cited by examiner

*Primary Examiner*—Reginald L Alexander
(74) *Attorney, Agent, or Firm*—Venable LLP; Robert Kinberg; Catherine M. Voorhees

(57) ABSTRACT

A machine readable identification on a single-serving unit containing coffee powder for espresso machines, designed so that it can be read easily and accurately, is structured in a rotation-symmetrical manner and is applied to an essentially level surface of the single-serving unit, whereby the single-serving unit preferably consists of a single-serving capsule (1) having an essentially circular base (2) whereupon the identification is applied in a coaxial manner.

3 Claims, 2 Drawing Sheets

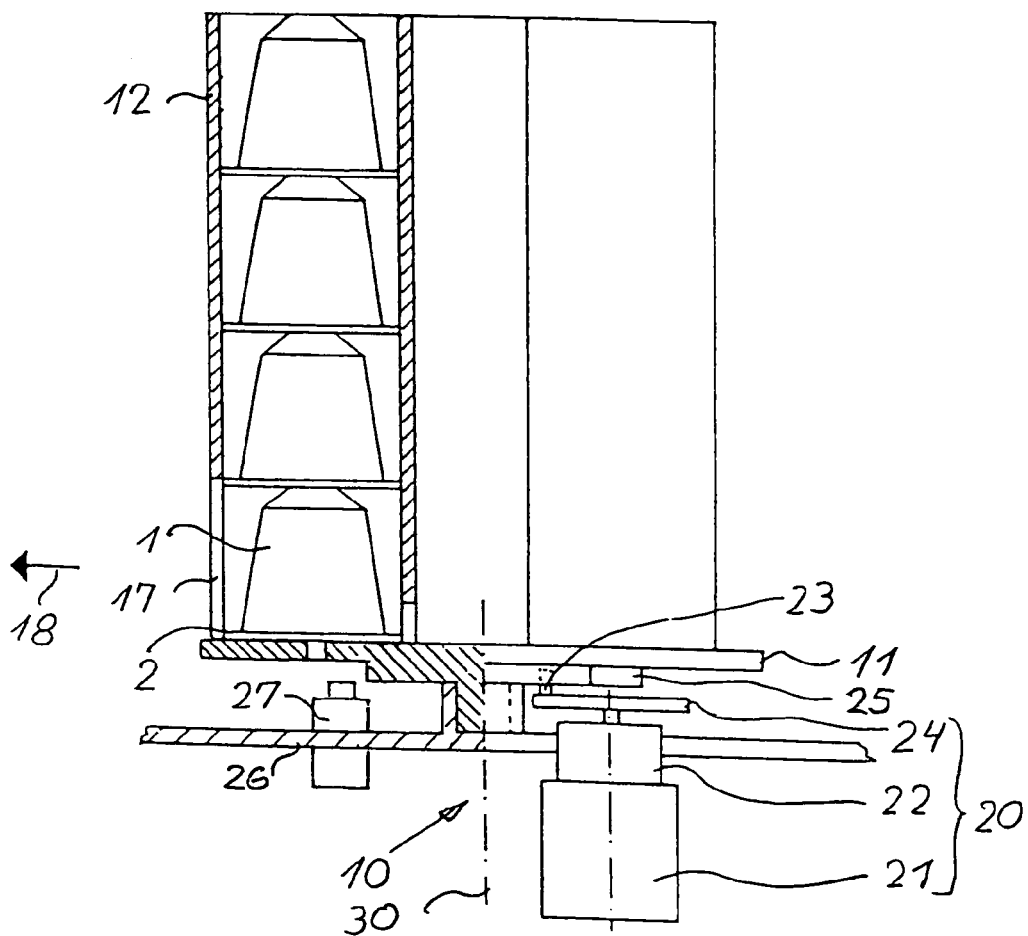
Schnitt A-B  Fig.3
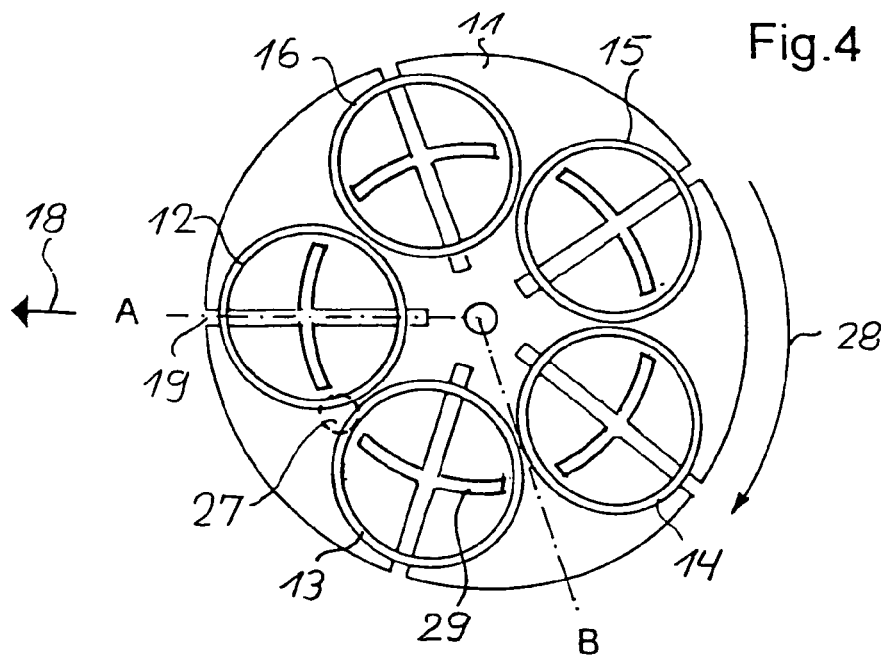
Fig.4

MACHINE-READABLE IDENTIFIER ON A PORTION PACKAGE, WHICH CONTAINS GROUND COFFEE, FOR ESPRESSO MACHINES

The invention concerns machine readable identification on a single-serving unit containing coffee powder for espresso machines.

Another aspect of the invention concerns a system particularly suitable for the registration of machine readable identification.

A further aspect of the invention concerns a testing procedure for the machine readable identification.

The invention concerns single-serving units for the simplified stocking of espresso machines with coffee powder. Increasingly, single-serving capsules or pouches are being used as single-serving units. The pouches enclose a certain amount of pre-portioned coffee powder within a transparent material similar to that of coffee filter paper. Compared to the previously common method of supplying the brewing head of an espresso machine with loose coffee powder, the use of pouches is advantageous due to the fact that the coffee powder contained therein is already pre-pressed, which is important for the generation of cream.

The single-serving capsules consist mostly of a deep-drawn plastic or aluminium foil and their advantage, when compared to pouches, lies in the fact that they have an air-tight seal and that certain manufacturers fill them with a protective gas containing the coffee aroma as well. Such pre-proportioned single-serving units are available for approximately 10 different coffee fillings. Due to this variety the consumer is able to stock smaller amounts of different types of coffee. In addition, the use of these single-serving units in conjunction with the special brewing heads of those espresso machines equipped to process such single-serving units results in a reliably constant optimum brew.

Such espresso machines, already known from EP 1 046 366 A1, for example, are provided with a storage magazine storing assorted single-serving units having different contents that are conveyed from the storage magazine into the brewing head during the course of an automatic brewing process. The storage magazine consists of cartouches, also termed magazine tubes, arranged on a turntable, wherein the individual single-serving units are stacked. In order to keep the different types of coffee separate and to select different coffee types, each magazine tube is stocked with only one type of coffee. At the start of the brewing process the selected magazine tube is rotated with the turntable into the dispensing position so that the desired type of coffee can be obtained. For this purpose the single-serving unit at the bottom of the stack inside the magazine tube is conveyed to a brewing chamber of the brewing head. Preferably each magazine tube is provided with a window so that the consumer is able to recognize the desired type of coffee, for example by means of a certain colour that is assigned to a certain type of coffee. It is also possible to equip the single-serving units with a certain identification code able to be registered by a reading device, so that the contents of the single-serving units can be recognized electronically. However, this method has thus far not been used for presently-known espresso machines. This may be due to the fact that the usual bar code structured in a linear manner to be read by a simple linear reading device must either be positioned correctly with regard to the position of the reading device, which is somewhat difficult in view of the inherent rotation-symmetric design of single-serving capsules and pouches due the technology of their manufacture, or that an expensive and voluminous double mirror scanner is required as the reading device.

Thus the use of a colour code for the identification of single-serving pouches according to their contents is now the premier method of identification. This method allows the consumer, without any guarantee, however, to stock the magazine tubes of the storage magazine in the correct manner and to select the desired type of coffee prior to the brewing process. For the automatic selection of one of the magazine tubes whereby the selection of the desired type of coffee is effected via a control panel or a knob, the magazine tubes may either be equipped with machine readable identification, or the respective position of the turntable, starting from a basic position, is electronically computed and stored. However, this system, whereby the correct manual stocking of the magazine tubes is assumed, cannot prevent stocking errors resulting in the incorrect automatic selection of the coffee type. This may well have very undesirable side effects, for example if a non-decaffeinated type of coffee is mistaken for a decaffeinated coffee.

It is thus the task of the present invention to equip the actual single-serving units to be selected with suitable machine readable identification whereby complicated voluminous double mirror scanners are not required for reading the identification code and whereby the accurate alignment of the single-serving pouch with regard to the scanner or its reading unit does not matter. In particular, the difficult process of aligning a rotation-symmetrical single-serving unit, whereby the shape of the capsule is mainly frustoconical and the pouch is mainly lozenge-shaped, is thus eliminated.

This task is implemented in a non-complicated manner according to the characterising part of claim 1 by the fact that the identification is rotation-symmetrical and is positioned on a mainly level part of the single-serving unit.

According to the invention, direct scanning or immediate reading of the identification on the single-serving unit, particularly of the single-serving capsule itself and not of any part of the storage magazine adjacent to the capsule, guarantees that the selected type of coffee is correctly identified with the single-serving unit and is actually being brewed after removal of the single-serving unit from the storage magazine. The identification can be read easily and accurately via an uncomplicated and compact reading head able to read in a linear manner, provided that the reading head is able to register the rotation-symmetrical identification. However, the rotational or angular position of the rotation-symmetrical identification with regard to the reading head that reads in a linear manner is not important, whereby the alignment of the single-serving unit with regard to the reading head is greatly simplified. In addition, the rotation-symmetrical identification is suitable for testing via a simple procedure according to claim 12.

The above-mentioned advantage, i.e. that the rotational or angular position of the single-serving unit with regard to the reading head does not matter, applies particularly to a rotation-symmetrical single-serving unit which does not have a preferred position, defined by its shape, around its symmetrical axis. In such cases the identification is preferably structured in a rotation-symmetrical manner around this symmetrical axis. Thus the reading head, reading in a linear manner, can register the identification regardless of the rotational or angular position of the single-serving unit, so that a single-serving unit stored inside a magazine tube can be identified regardless of the rotational position of the single-serving unit inside the magazine tube. Thus any measures ensuring the definite alignment of the single-serving units inside the magazine tube can be eliminated.

In particular, according to claim 3 such rotation-symmetrical identification may be an ID code consisting of concentric circles, whereby the usual linear reading heads can be used. If the ID code is a multi-digit binary code, just four concentric circles are sufficient to reliably identify a great variety of coffee types.

If the single-serving unit consists of a capsule with a mainly circular base, according to claim 4, the identification as defined above is applied to the base in a coaxial manner. If the single-serving unit consists of an essentially lozenge-shaped pouch with an upper and a lower surface, the identification is applied to each surface in a coaxial manner. Therefore it does not matter, with regard to the machine reading of the identification, whether the upper or the lower surface of a pouch is facing downwards when the pouches are inserted into the storage magazine.

Apart from coffee type identification, the identification on any single-serving unit may also contain producer identification, whereby the latter in conjunction with an adapted evaluation system for controlling the espresso machine can block operation of the espresso machine if the producer identification on the single-serving unit does not correspond to the machine's preprogrammed producer identification.

As mentioned above, an uncomplicated system for the registration of the machine readable identification on a single-serving unit according to the invention may consist of a registration device with at least one reading head able to read in a linear manner. The reading head comprises a reading sensor consisting of a transmitter scanning a luminous spot on the identification or part thereof, and of a decoder receiver. The latter may be equipped with a controlling device whereby the setting, particularly that of a magazine unit, can be controlled in order to convey the single-serving units containing the desired coffee type into the dispensing position.

According to claim 7 the linear reading head is located in a compact and secure position below the magazine tubes of the magazine unit. The reading head is directed upwards towards the plane where the bases of the single-serving capsules are positioned within the magazine tubes, in such a way that the rotation-symmetrical identification on the base of the respective lowest single-serving capsule can be read.

Furthermore, the carrier of a system whereby the magazine tubes are positioned on a carrier and may be conveyed together with that carrier, if desired, is provided with a transparent section at least in the area below the magazine tubes so that the base of any single-serving capsule can be scanned. The transparent section may be designed in particular as a radially positioned slit-shaped window.

A scanner and a transparent section may be provided below each magazine tube. This type of configuration ensures that the identification of all single-serving capsules in the lowest position inside each magazine tube can be read in a parallel manner. Based on the respective registered positions of the capsules containing various types of coffee, the magazine tube whose lowest-positioned single-serving capsule contains the selected coffee type is then conveyed to the dispensing position.

However, according to claim 9 it may also be sufficient to provide one reading station with just one scanning head for all magazine tubes, whereby the reading station is positioned before the dispensing station in the conveying direction, at the conveying path of those sections of the carrier that are able to move together with the carrier and are transparent so that the identification can be read. In this way it is possible to check if a single-serving unit containing the desired coffee type is conveyed into the dispensing position, whereby conveyance is controlled according to the stored positions of the single-serving capsules containing the various types of coffee.

The invention can be used to great advantage in a compact system according to claim 11, whereby the magazine tubes are arranged in a mainly circular manner on a turntable serving as carrier. A Maltese-cross-type drive mechanism is positioned below the turntable and is connected to the latter via an actuation connection. The turntable is adjustable whereby its adjustment may be controlled via the registration device containing the reading head/s for reading the identification of the respective lowest single-serving capsule within the magazine tubes.

As mentioned above, the rotation-symmetrically constructed identification on a single-serving unit is suitable for testing via a simple testing procedure according to claim 12. According to this procedure, the ID code consisting of concentric circles is essentially read in a linear manner across its greatest diameter, formed by a first radius and a second radius, whereby the identification read across the first radius is compared with that read across the second radius. If the ID code is registered correctly, the two identifications read separately must concur. Otherwise an espresso machine designed to carry out testing may be blocked for safety reasons.

Design types of the invention are described below by means of the drawing, whereby additional characteristics and advantages may result.

FIG. 3 shows in a partial cross-section, the lateral view of a system with a magazine unit as well as with a registration unit, and FIG. 4 shows a plan view of the system according to FIG. 3.

Basic unit assembly groups that do not immediately serve to register the identification on the single-serving units used here are not shown in FIG. 3 and FIG. 4.

Figure 1:
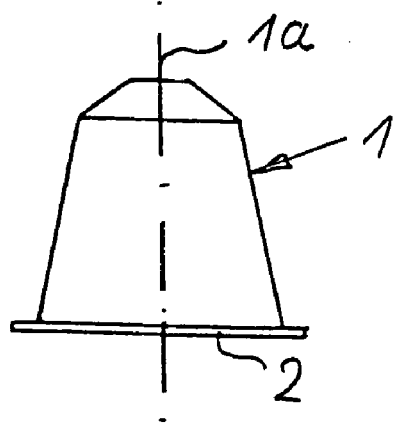
FIG. 1 shows the lateral view of a single-serving capsule.
Figure 1A:
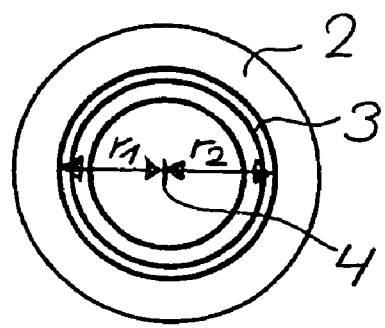
FIG. 1a shows a view of the base of the single-serving capsule according to FIG. 1.

FIGS. 1, 1a and 3 show a single-serving capsule 1 of an essentially frustoconical design arranged in a rotation-symmetrical manner around a symmetrical axis 1a.

An ID code 3 consisting of concentric circles is shown on the base 2 of the single-serving capsule 1, whereby the symmetrical axis 1a of the single-serving capsule passes through the centre point 4 of the circles.

Figure 2:
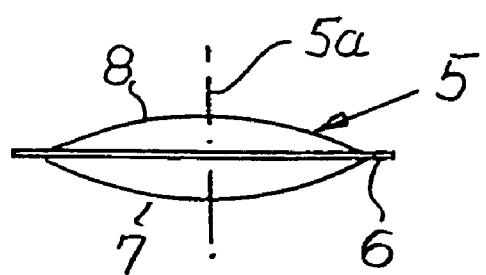
FIG. 2 shows the lateral view of a pouch
Figure 2A:
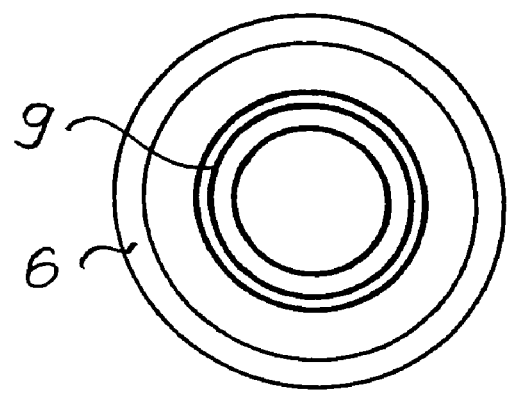
FIG. 2a shows a view of the upper or lower surface of the pouch

FIGS. 2 and 2a show a pouch 5 containing one serving of pre-pressed coffee powder whereby the pouch, with the exception of its edge 6, is essentially lozenge-shaped. The pouch 5 with its edge 6 are arranged in a rotation-symmetrical manner around a symmetrical axis 5a. The lower surface 7 as well as the upper surface 8 of pouch 5 is provided with an ID code 9 consisting of concentric circles and extending in a rotation-symmetrical manner around the symmetrical axis 5a.

A system with a magazine unit 10 suitable for storing single-serving capsules 1 is described below by means of FIGS. 3 and 4. A magazine unit for pouches may be similarly designed.

The magazine unit 10 essentially consists of a turntable 11 whereby magazine tubes 12 to 16 are arranged on the turntable in an approximately circular manner. Each magazine tube is designed to hold a stack of single-serving capsules 1 whose bases 2 are each facing downwards, whereby each of the magazine tubes 12 to 16 contains single-serving capsules containing one of several available coffee types. Each magazine tube is provided with an ejection opening 17 adjacent to the outer edge (no reference number given) of the turntable 11, whereby the respective single-serving capsule 1 that is in the lowest position is ejected by means not described here through the magazine tube opening 17 that has been rotated to a dispensing position, i.e. dispensing station 18.

In order to move the selected magazine tube 12 to 16 to the dispensing position 18 for the purpose of removing a single-serving capsule, a Maltese-cross-type drive mechanism 20 is positioned below turntable 11 and is coupled with the latter. The Maltese-cross-type drive mechanism essentially consists of a driving motor 21 with a drive mechanism 22 and a Maltese-type driving pin 23 on a disc 24 that is connected to the drive mechanism. The Maltese-type driving pin is positioned in such a way that it is able to engage between two flanks each of the Maltese-type drive mechanism, whereby one of these flanks 25 is firmly connected to the turntable 11 or is formed as one unit together with the turntable.

The Maltese-cross-type drive mechanism 20 is mounted below the turntable 11 on a support frame 26 which also serves as mounting of turntable 11.

The support frame 26 also carries a reading head 27 mainly consisting of a scan transmitter and an encoder receiver. Reading head 27 is pointing from below towards the turntable 11 in such a way that it is able to register and scan the single-serving capsules stacked with their base facing downwards inside the magazine tubes 12 to 16 when the magazine tubes are moved across the reading head 27. For this purpose at least part of turntable 11 is transparent to the scanning of the ID code: windows 29 located below the magazine tubes 12 to 16 are designed as slits and are each arranged at equal radial distance to a main axis 30 of turntable 11, cf. FIG. 3. The ID codes 3 on the bases 2 of the single-serving capsules can be registered across their greatest radius $r_1$ and $r_2$ through these slits, according to FIG. 1a. In this case ID code 3 is being registered on entering and on leaving the reading station when the base 2 of the capsule, equipped with the ID code, passes on its circular path across reading head 27 arranged in front of dispensing station 18 in the direction of rotation 28 of the turntable. It is thus guaranteed, via comparison of the two registered ID codes as well as via data processing, that only one single-serving capsule 1 containing the desired coffee type is conveyed to the dispensing station 18, once the desired coffee type has been selected, for example by means of a control panel or a knob.

List of Reference Numbers 1 single-serving capsule
2 base
3 ID code
4 centre point
5 pouch
6 pouch edge
7 lower surface
8 upper surface
9 ID code
10 magazine unit
11 turntable
12 magazine tube
13 magazine tube
14 magazine tube
15 magazine tube
16 magazine tube
17 ejection opening of magazine tube
18 dispensing station (or position)
19 capsule ejection slit
20 Maltese-cross-type drive mechanism
21 driving motor
22 drive
23 Maltese-type driving pin
24 disc
25 flank of Maltese-type drive mechanism
26 support frame
27 reading head
28 direction of rotation
29 slit-shaped window
30 main axis

The invention claimed is:

1. A magazine unit (10) of a coffee machine for storing single serving capsules and processing machine readable identifications disposed on the single serving capsules for election of one of a plurality capsules in a coffee machine comprising:

several magazine tubes (12 to 16), each magazine tube adapted to hold single serving capsules (1) containing various types of coffee powder where the single serving capsules have an essentially circular base (2);

a registration device with at least one reading head (27) adapted to read the identification consisting of concentric circles disposed on the single serving capsules in a linear manner, wherein the reading head (27) is positioned below the magazine tubes (12 to 16) and is directed upwards, toward a plane where the bases of the single serving capsules (1) are located inside the magazine tube (12 to 16) in such a way that identification of single serving capsules can be read in a linear manner, a carrier wherein the magazine tubes (12 to 16) are located on the carrier and can each be conveyed, as selected, together with the carrier to a dispensing position (18), and that the carrier is provided with transparent sections located below each magazine tube (12 to 16) for scanning the base (2) of the single-serving capsule (1) with the at least one reading head (27), and a turntable (11) and a Maltese-cross-type drive mechanism (20) wherein the magazine tubes (12 to 16) are arranged in an essentially circular manner on the turntable (11) serving as carrier and that the Maltese-cross-type drive mechanism (20) is positioned below the turntable (11) whereby the drive mechanism (20) is connected to the turntable (11) via an actuation connection.

2. Magazine unit according to claim 1, characterized by the fact that for all magazine tubes (12 to 16) only one scanning head (27) is provided at a reading station that is located in front of the dispensing station (18) at a path of movement of those sections of the carrier able to move together with the carrier that are transparent in order to read the identifications.

3. Magazine unit according to claim 1, characterized by the fact that adjustment of the carrier or turntable (11) can be controlled via the registration device.

* * * * *